US010974567B2

(12) United States Patent
Ostrowski et al.

(10) Patent No.: US 10,974,567 B2
(45) Date of Patent: Apr. 13, 2021

(54) AUTOMATIC ADAPTIVE CLIMATE CONTROLS

(71) Applicant: FORD GLOBAL TECHNOLOGIES, LLC, Dearborn, MI (US)

(72) Inventors: David Alfred Ostrowski, Northville, MI (US); Elizabeth Anne Manwell, Canton, MI (US); William Gordon Herbert, Bloomfield, MI (US); Mohan John, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 255 days.

(21) Appl. No.: 16/137,027

(22) Filed: Sep. 20, 2018

(65) Prior Publication Data

US 2020/0094651 A1 Mar. 26, 2020

(51) Int. Cl.
*B60H 1/00* (2006.01)
*G06N 5/04* (2006.01)
*G06N 20/00* (2019.01)

(52) U.S. Cl.
CPC ....... *B60H 1/00971* (2013.01); *B60H 1/0075* (2013.01); *B60H 1/00742* (2013.01); *B60H 1/00764* (2013.01); *B60H 1/00964* (2013.01); *G06N 5/046* (2013.01); *G06N 20/00* (2019.01)

(58) Field of Classification Search
CPC ............ B60H 1/00971; B60H 1/00742; B60H 1/00764; B60H 1/00964; B60H 1/0075; G06N 20/00; G06N 5/046
See application file for complete search history.

(56) References Cited

U.S. PATENT DOCUMENTS

| 557,994 | A | | 4/1896 | Lanston |
| 5,187,943 | A | * | 2/1993 | Taniguchi .......... B60H 1/00742 62/180 |
| 5,511,724 | A | | 4/1996 | Freiberger et al. |

(Continued)

FOREIGN PATENT DOCUMENTS

| EP | 1262346 A2 | 12/2002 |
| EP | 1418476 A | 5/2004 |

OTHER PUBLICATIONS

IEEE reference—Kah et al.—https://ieeexplore.ieee.org/document/487722/authors#authors (Year: 2002).*

*Primary Examiner* — Navid Ziaeianmehdizadeh
(74) *Attorney, Agent, or Firm* — David Coppiellie; King & Schickli, PLLC (57) ABSTRACT

Systems and methods for controlling an automatic climate control system of a vehicle include, by one or more onboard processors in operative communication with one or more sensors, initiating the automatic climate control system. The processors receive from the one or more sensors at least a vehicle input and a user identifier input. A unique user climate control system actuation action is implemented according to the received vehicle input and user identifier input provided by applying at least one predictive model to a stored set of climate control system operating parameters. A unique user climate control system operating pattern is implemented according to the received vehicle input and user identifier input provided by applying at least one different predictive model to the stored set of climate control system operating parameters.

19 Claims, 9 Drawing Sheets

(56) References Cited

U.S. PATENT DOCUMENTS

| | | |
|---|---|---|
| 6,616,057 B1 | 9/2003 | Kelly et al. |
| 9,555,689 B2 | 1/2017 | Sebastian et al. |
| 2005/0077037 A1 | 4/2005 | Pham et al. |
| 2015/0046060 A1 | 2/2015 | Nikovski et al. |
| 2017/0158023 A1* | 6/2017 | Stevanovic ........ B60H 1/00771 |
| 2017/0282821 A1* | 10/2017 | Zych ................ B60W 50/0098 |

* cited by examiner

AUTOMATIC ADAPTIVE CLIMATE CONTROLS

TECHNICAL FIELD

This disclosure relates generally to vehicle climate control systems. More particularly, the disclosure relates to a control system for automatically controlling and adjusting vehicle climate control system settings according to current cabin and external ambient environment sensor data, current driver/passenger climate control settings, previously established driver/passenger preferences stored in a database of user behavior/actions, and a predictive model.

BACKGROUND

Various systems and mechanisms are provided in the modern vehicle for establishing and maintaining vehicle occupant comfort, primarily mediated by way of the vehicle climate control systems, for example the heating, ventilation, and air-conditioning (HVAC) systems. In operating such systems and mechanisms, typically the vehicle occupant is required to exercise some element of manual control to adjust the mechanisms to his or her satisfaction. Climate control systems often require extensive user interaction to produce the desired result on passenger cabin comfort levels according to particular external and internal climate conditions.

Climate controls can be confusing and often require extensive user interaction to obtain the desired result. However, patterns of driver/passenger behavior to obtain desired cabin climate comfort conditions can be identified. As one non-limiting example, the "max AC" setting of the HVAC system, when actuated, typically changes the temperature setpoint to the lowest possible level, turns on automatic recirculation, and sets the HVAC blower speed to the maximum allowable. Because the goal is to cool the passenger cabin as quickly as possible, the user normally allows "max AC" setting remains constant as the passenger cabin temperature changes. Typically, the "max AC" setting is engaged only for a short period of time. As the perceived cabin temperature approaches the desired temperature/comfort level, users then manually adjust the climate control system to arrive at the exact desired condition.

This type of user behavior pattern for various climate control settings can be used in developing adaptive models for automating the climate control system settings under particular climate conditions, reducing the amount of user manual interaction required. In particular, such adaptive models would advantageously adjust climate control systems automatically according to determined user behavior patterns continually as the passenger cabin environment changes, i.e. as temperature and other elements contributing to comfort or perceived comfort levels change.

SUMMARY

In accordance with the purposes and benefits described herein and to solve the foregoing and other problems, in one aspect of the present disclosure a method for controlling an automatic climate control system of a vehicle is disclosed, comprising by one or more onboard processors in operative communication with one or more sensors initiating the automatic climate control system. The one or more processors receive from the one or more sensors at least a vehicle input and a user identifier input. A unique user climate control system actuation action is implemented according to those inputs, provided by applying at least one predictive model to a stored set of climate control system operating parameters. Likewise, a unique user climate control system operating pattern is implemented according to those inputs provided by applying at least one different predictive model to the stored set of climate control system operating parameters. The method further includes receiving, by the one or more onboard processors, a sensor input indicative of a manual initiation of the automatic climate control system. The one or more onboard processors may store a unique user climate control system actuation action and a unique climate control system operating pattern for each of one or more users.

In embodiments, the method includes, by the one or more onboard processors, receiving from a sensor a user manual climate control system override action input. One or both of the at least one predictive model and the at least one different predictive model may be updated according to the user manual climate control system override action input to provide one or both of an updated unique user climate control system actuation action and an updated unique user climate control system operating pattern. One or both of the updated unique user climate control system actuation action and the updated unique user climate control system operating pattern may be stored in memory.

In embodiments, the method includes, by the one or more onboard processors, receiving the vehicle input from the one or more sensors as one or more of: an ambient temperature input, a passenger cabin temperature input, a clock input, a calendar input, a trip statistic, a driver aggressivity of vehicle operation metric, a determination of a climate control system operative status, and a determination of a vehicle engine operative status.

In embodiments, the method includes, by the one or more onboard processors, selecting the unique user climate control system actuation action from one or both of powering on one or more of a climate control system heating mode, a climate control system air-conditioning mode, and a climate control system recirculation mode, and powering off one or more of the climate control system heating mode, the climate control system air-conditioning mode, and the climate control system recirculation mode.

In embodiments, the at least one predictive model is a Classification and Regression Tree (CART) model. The method may include, by the one or more onboard processors, selecting a first CART model for the steps of powering on and selecting a second CART model for the steps of powering off. The method may include, by the one or more onboard processors, selecting the unique user climate control system operating pattern from one or both of setting a climate control system temperature setpoint value and setting a climate control system blower speed value.

In embodiments, the at least one different predictive model is a multilayer perceptron behavior classifier model. The method may include, by the one or more onboard processors, selecting a first multilayer perceptron behavior classifier model for the step of setting the climate control system temperature setpoint value and selecting a second multilayer perceptron behavior classifier model for the step of setting the climate control system blower speed value.

In embodiments, the user manual climate control system override action input includes one or more of: manually powering on or off a climate control system heating mode, manually powering on or off a climate control system air-conditioning mode, manually powering on or off a climate control system recirculation mode, manually adjusting a climate control system temperature setpoint value, and manually adjusting a climate control system blower speed value.

In another aspect of the disclosure, a system for controlling an automatic climate control system of a vehicle is disclosed, comprising a controller in operative communication with one or more sensors, the controller comprising one or more onboard processors, memory, and storage and being configured at least to: initiate the automatic climate control system, receive from the one or more sensors at least a vehicle input and a user identifier input, implement a unique user climate control system actuation action according to the received vehicle input and user identifier input provided by applying at least one predictive model to a stored set of climate control system operating parameters, and implement a unique user climate control system operating pattern according to the received vehicle input and user identifier input provided by applying at least one different predictive model to the stored set of climate control system operating parameters.

The controller may further be configured to receive from the one or more sensors an input indicative of a manual initiation of the automatic climate control system. The controller may be further configured to receive from the one or more sensors a user manual climate control system override action input and to update one or both of the at least one predictive model and the at least one different predictive model according to the user manual climate control system override action input to provide one or both of an updated unique user climate control system actuation action and an updated unique user climate control system operating pattern. The controller may further store one or both of the updated unique user climate control system actuation action and the updated unique user climate control system operating pattern.

In embodiments, the one or more sensors are selected from the group consisting of: an ambient temperature sensor, a passenger cabin temperature sensor, a clock or timer, a calendar application, a sensor adapted to provide inputs relative to a trip statistic, an engine speed sensor, and an engine starter sensor.

In embodiments, the controller is further configured to select the unique user climate control system actuation action from one or both of powering on one or more of a climate control system heating mode, a climate control system air-conditioning mode, and a climate control system recirculation mode, and powering off one or more of the climate control system heating mode, the climate control system air-conditioning mode, and the climate control system recirculation mode.

In embodiments, the controller is further configured to select the unique user climate control system operating pattern from one or both of setting a particular climate control system temperature setpoint value and setting a particular climate control system blower speed value. The controller may be further configured to determine the user manual climate control system override action input according to inputs received from one or more sensors indicative of one or more of: manually powering on or off a climate control system heating mode, manually powering on or off a climate control system air-conditioning mode, manually powering on or off a climate control system recirculation mode, manually adjusting a climate control system temperature setpoint value, and manually adjusting a climate control system blower speed value.

In the following description, there are shown and described embodiments of the disclosed automatically adaptive climate control system and associated methods. As it should be realized, the disclosed systems and methods are capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWING

The accompanying drawing figures incorporated herein and forming a part of the specification, illustrate several aspects of the disclosed automatically adaptive climate control system and associated methods, and together with the description serve to explain certain principles thereof. In the drawing.

Reference will now be made in detail to embodiments of the disclosed automatically adaptive climate control system and associated methods, examples of which are illustrated in the accompanying drawing figures.

DETAILED DESCRIPTION

At a high level, the present disclosure is directed to methods for automatically controlling settings of a vehicle climate control system, and to systems implementing the methods. The methods and systems, in certain situations, automate the climate control system controls, including without intending any limitation temperature setpoints, recirculation settings, actuation of various elements of the climate control system such as the air-conditioning (AC) or heater mode, HVAC blower speed settings, and others. Adaptive "preferences" derived from past user behavior are supported, allowing the described systems to "learn" climate control system preferences under various climatic conditions for one or more vehicle occupants. Advantageously, two or more adaptive preferences are supported, allowing implementing climate control preferences of two or more vehicle users. In turn, separate classification models are maintained for determining climate control system actuation parameters (on/off) and adjustment of climate control system operating parameters (settings) when operating, providing a still greater degree of fine-tuning of the system to meet user preferences.

Figure 1:
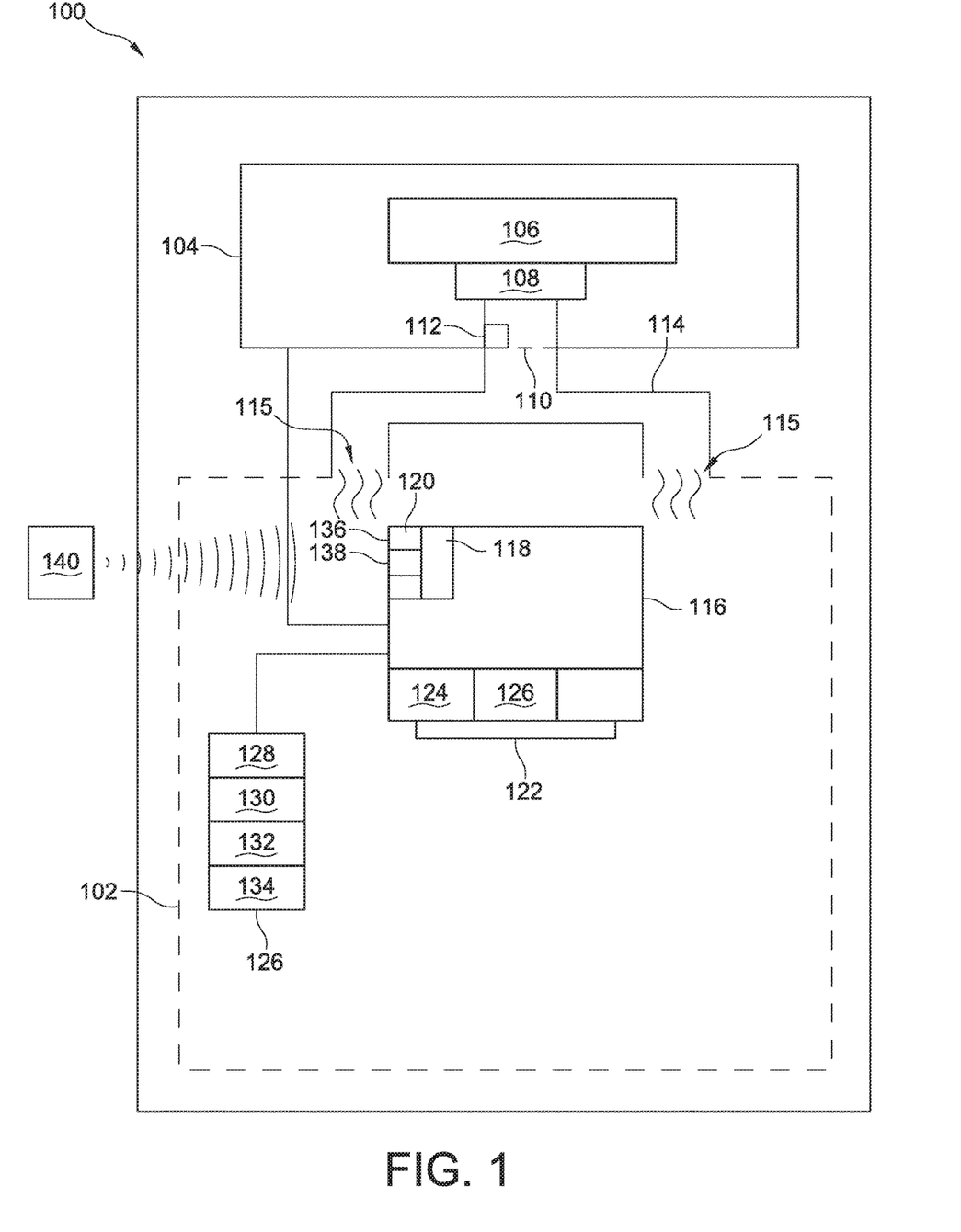
FIG. 1 schematically illustrates a vehicle equipped with systems for controlling an automatic climate control system according to the present disclosure.

FIG. 1 schematically illustrates a vehicle 100 including a passenger cabin 102 whose environment is kept at a desired comfort level by a climate control system. The basic elements for climate control in a vehicle are well-known to the skilled artisan, and a detailed description thereof is unnecessary to the present disclosure. However, at a high level the vehicle 100 includes an HVAC system 104, which as is known comprises various elements including without intending any limitation a compressor, an evaporator core, and others represented generally by reference numeral 106. The climate control system 104 further includes a blower 108 in fluid communication with an air distribution door 110. As is known, the air distribution door 110 may be automatically controlled by way of an actuator 112 controlling mechanical linkages (not shown) of various designs. The air distribution door 110 in turn places the blower 108 in fluid communication with a duct system 114 through which conditioned airflow is introduced into the passenger cabin 102 by way of air registers 115. Only front air registers 115 are shown for convenience, but the skilled artisan is well aware that a plurality of air registers is typically provided at various locations of the vehicle 100 to provide for driver and passenger comfort.

A climate control system 116 is in operative communication with the HVAC system 104. By the climate control system 116, the HVAC system 104 may automatically or by user command control an amount and a temperature of airflow introduced into the passenger cabin 102. Operative control is provided in part by a climate control module (CCM) 118 comprising at least a controller 120 provided with one or more processors, one or more memories, and storage comprising logic configured for controlling the vehicle HVAC system 104 and potentially other vehicle 100 systems.

Manual control of the climate control system 116 and therethrough the HVAC system 104 and other vehicle 100 systems is provided by at least one control panel 122 providing a variety of controls for activating various climate control system modes, including heating mode, air-conditioning mode, recirculation mode, and others. Specifics of the control panel 122 are described in greater detail below.

The vehicle 100 may further include other systems, including a navigational system 124 of known design which accesses onboard or remotely sourced map information, traffic information, etc. to plot trip routes, track trip statistics such as distance traveled, monitor vehicle speed, and others. Such systems are known in the art and are typically provided with a geographical location system which can accurately determine a geographical position of the vehicle and communicate such position as an input to the controller 120 or another vehicle-associated controller. A number of such geographical location systems are known, such as Global Positioning Satellite technology. The climate control system 116, navigational system 124, and other vehicle 100 systems may communicate with the CCM 118/controller 120 and/or may be associated with various other vehicle components or systems, for example with Ford Motor Company's SYNC® integrated in-vehicle communications and entertainment system. Each may provide user control via a dedicated control panel 122 (embodiment not shown) or each may be controlled/monitored by a user via a single control panel 122 as shown in the depicted embodiment.

The CCM 118/controller 120 is placed in communication with a variety of sensors and actuators, including without intending any limitation at least a sensor array 126 comprising at least one or more on-board ambient temperature sensors 128 and one or more passenger cabin temperature sensors 130, one or more onboard ambient humidity sensors 132 and one or more passenger cabin humidity sensors 134, and others. The controller 120 or another vehicle controller such as the BCM (not shown) may include a clock 136 and/or a timer 138 which automatically begins running on occurrence of an event such as initiation or cessation of operation of the vehicle 100, initiation or cessation of operation of the HVAC system 104, etc.

The controller 120 may further be configured to receive an input indicative of a user identity, for example of a specific vehicle 100 driver. Any number of ways to accomplish this are known, for example by way of inputting user identity information via control panel 122 or another control panel. Alternatively, the user identity input may be provided by way of an automatic signal generated by a user-carried device 140. This can be accomplished by a number of known devices 140, including without intending any limitation a signal emitted by a user-carried keyfob, smartkey, smartphone, smartphone equipped with phone-as-a-key logic, and others.

Figure 2:
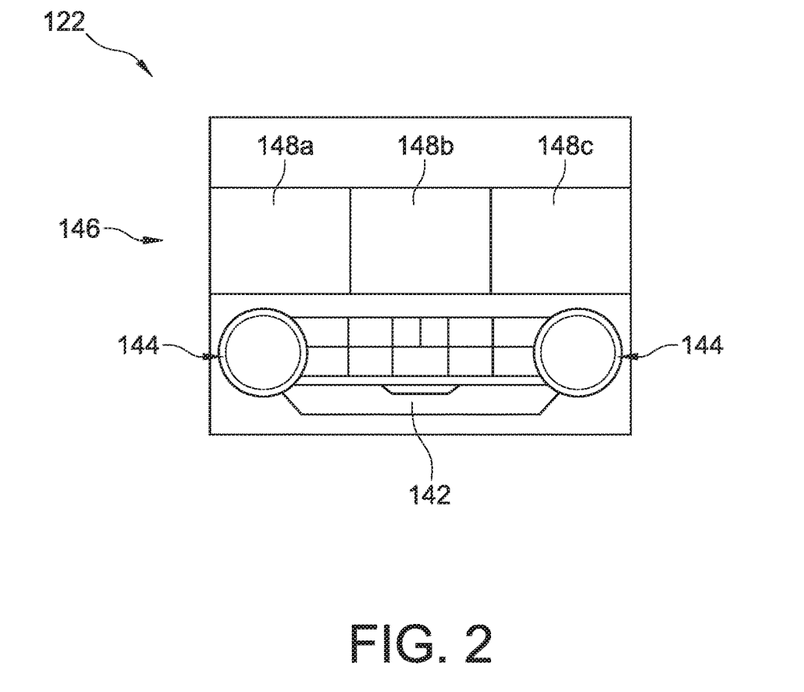
FIG. 2 shows an embodiment of a control panel for an automatic climate control system according to the present disclosure.

With the foregoing as background, the present disclosure provides methods and systems for automatically controlling the climate control system 116 by way of the CCM 118/controller 120 according to at least one vehicle input and a user identifier input. A representative control panel 122 for implementing automatic control of the climate control system 116 is shown in FIG. 2. The control panel 122 includes various conventional buttons 142, knobs 144, and other actuators for manual control of the climate control system 116. The control panel 122 further includes an adaptive climate control panel 146 comprising additional actuators 148n which allow one or more users to implement manual control of the climate control system 116 or alternatively to implement automatic control of the climate control system. In the depicted embodiment, an actuator 148a provides for automatic control by the CCM 118/controller 120 of the climate control system 116 according to a first users last-stored preferences, an actuator 148b provides for automatic control by the CCM 118/controller 120 of the climate control system 116 according to a different users last-stored preferences, and an actuator 148c provides for manual control of the climate control system 116 by use of buttons 142, knobs 144, etc. Of course, more or fewer actuators 148n are possible and contemplated according to the number of different users of the vehicle 100 and other factors.

It will be appreciated that automatic control of the climate control system 116 according to the systems described above and the methods described below could be provided as a default, with user identity being provided to the CCM 118/controller 120 by a user device 140 as described above. In this embodiment, manual control of the climate control system 116 could be restored by actuating one or more of the conventional buttons 142, knobs 144, etc., or by providing a dedicated "manual mode" actuator 148c.

Figure 3:
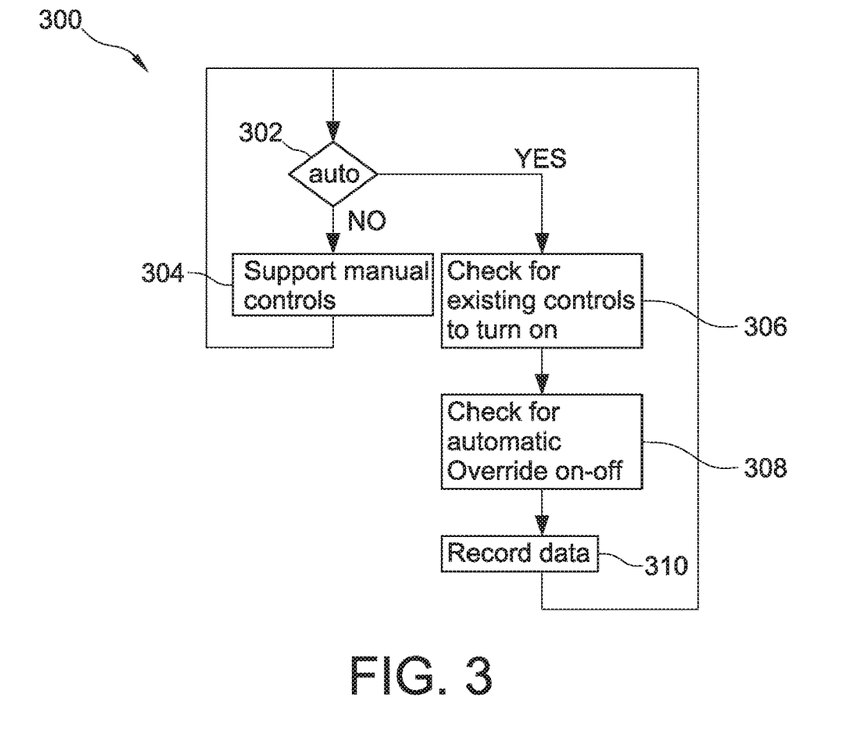
FIG. 3 graphically illustrates a learning mode for an automatic climate control system according to the present disclosure.

FIG. 3 illustrates at a high level and in graphical form a "learning mode" method 300 for the climate control system 116 made possible by the present methods and systems. As described above, "automatic mode" may be a default condition on initializing the climate control system 116, starting the vehicle 100 engine (not shown), or other action. Alternatively, automatic mode may be activated by a user via control panel 122 or another control panel. At step 302, the CCM 118/controller 120 verifies that the climate control system 116 is in automatic mode. If not, at step 304 the CCM 118/controller 120 verifies that manual control of the climate control system 116 is enabled.

If so, at step 306 the CCM 118/controller 120 verifies that existing controls for the climate control system 116 have been automatically enabled and begins recording data. The data recorded include at least a vehicle input and the user identifier input. This includes implementing one or more automatic climate control system actuation actions selected according to the vehicle input and user identifier input and implementing one or more automatic climate control system operating patterns. The one or more climate control system actuation actions may include powering on or off the climate control system 116 heating mode, powering on or off the climate control system 116 air-conditioning mode, and powering on or off the climate control system 116 recirculation mode. The one or more climate control system operating patterns may include setting a climate control system 116 temperature setpoint, setting a climate control system blower 108 speed, and others. At step 308, the CCM 118/controller 120 queries for inputs indicative of any manual overrides of any of the one or more automatic climate control system actuation actions and one or more automatic climate control system operating patterns. This could be manually changing a temperature setting or blower speed, or powering on or off a climate control system 116 mode such as heating, air-conditioning, etc. At step 310, the CCM 118/controller 120 records the inputs indicative of any manual overrides. This information is used to adjust the one or more automatic climate control system actuation actions and one or more automatic climate control system operating patterns associated with a particular user.

The one or more automatic climate control system actuation actions and one or more automatic climate control system operating patterns associated with a particular user are determined by the CCM 118/controller 120 according to various predictive models which in concert predict user climate control system 116 setting preferences according to historical data as informed and refined by real-time data provided by sensor array 126. The predictive model could initially determine the one or more automatic climate control system actuation actions and one or more automatic climate control system operating patterns associated with a particular user from a first recorded use of the climate control system 116 in particular environmental conditions by the user.

However, a more accurate and efficient way would be to provide an initial default database 152 for use by the CCM 118/controller 120. The initial default database 152 could be a historical record of climate control system actuation actions and climate control system operating patterns for a plurality of users in a variety of environmental conditions during a recording period, for example a yearlong (or more) record of climate control system 116 operating patterns for a plurality of users across all seasons of the recording period. Thus, on initial use the implemented climate control system actuation actions and climate control system operating patterns would represent the prevailing actions/patterns for the survey population, i.e. the plurality of users. This initial default database would then be informed and refined by a particular user's actions as will be described below.

Figure 4:
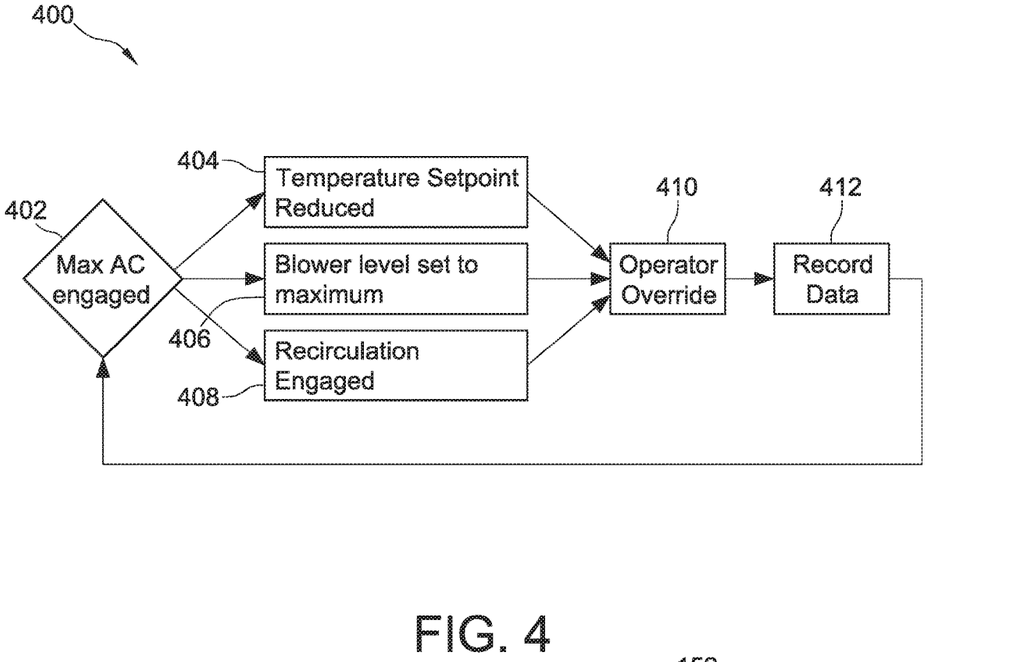
FIG. 4 illustrates the learning mode of FIG. 3 for an automatic climate control system in "max AC" mode.

A specific example 400 of the above process is illustrated in FIG. 4. When the climate control system 116 is placed in max AC mode (step 402), the CCM 118/controller 120 automatically reduces the temperatures setpoint to the lowest setting (step 404), sets the blower 108 to the highest speed setting (step 406), and engages the climate control system 116 recirculation mode (step 408). If an operator override of any of these settings is detected (step 410), at step 412 this override action and associated vehicle inputs 150 and user identity are recorded to inform the next use of the climate control system 116 in max AC mode, thus tailoring the automatic climate control system 116 to a particular user preference.

Figure 5:
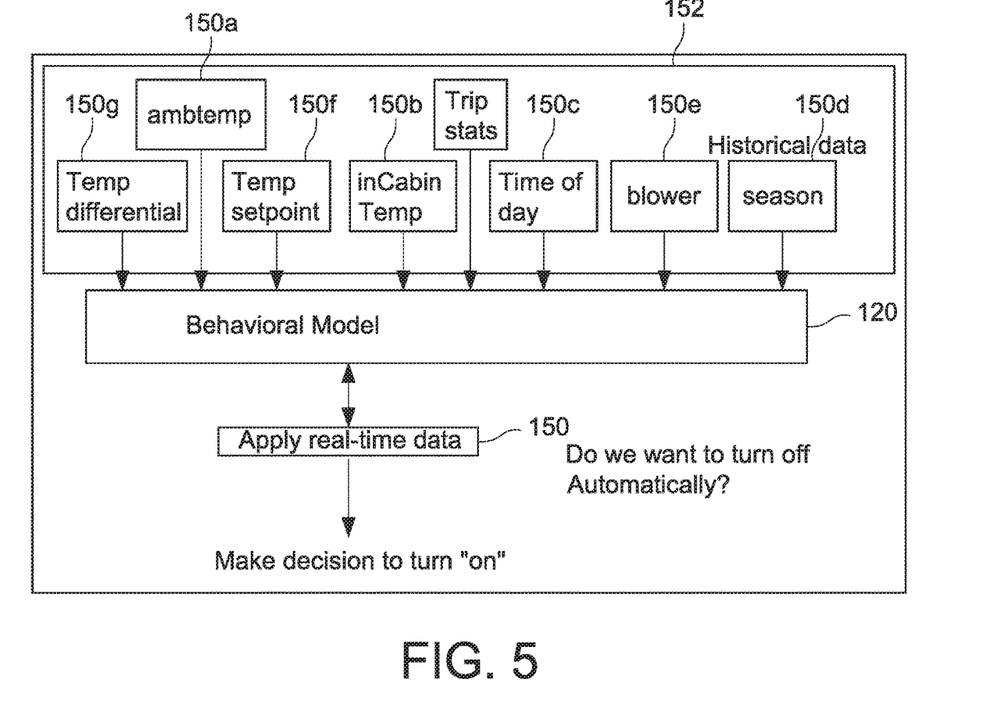
FIG. 5 illustrates a mode of operation of an automatic climate control system according to the present disclosure.

With reference to FIG. 5, the CCM 118/controller 120 is configured to consider various vehicle inputs 150 affecting user climate control system 116 preferences. These may include iterative ambient temperature inputs 150$a$, iterative passenger cabin temperature inputs 150$b$, time of day inputs 150$c$, and season inputs 150$d$. The CCM 118/controller 120 further receives other vehicle inputs 150 indicative of particular user preferences, including a blower 108 setting input 150$e$ and a climate control system 116 temperature setpoint input 150$f$. Other inputs could be an ambient temperature: passenger cabin temperature differential input 150$g$ calculated by the CCM 118/controller 120.

A historical record of these vehicle inputs 150 and the automatic climate control system 116 actuation actions and automatic climate control system 116 operating patterns associated with a particular user is stored in memory as database 152. As will be appreciated, these vehicle inputs 150 provide data informing CCM 118/controller 120 that a particular user will apply a particular climate control system 116 operating pattern under particular environmental conditions. As one simplistic example, for user A, at an ambient temperature of 90° F. at noontime in August, the historical records in database 152 may indicate that user A has exhibited a preference for operating the climate control system 116 in air-conditioning mode at a specific temperature setpoint and blower 108 speed. The CCM 118/controller 120 receives real-time vehicle inputs 150 from sensor array 126 as described above and, using the information in database 152, makes a determination as to the historically preferred climate control system 116 operating pattern as stored in the database 152 for a user according to those vehicle inputs 150, for example actuating a heating mode, an air-conditioning mode, a recirculation mode, etc., and further establishing climate control system temperature setpoints and blower 108 speed setpoints. From this information, the CCM 118/controller 120 would make the decision to actuate a particular climate control system 116 mode, establish a particular temperature setpoint and blower speed, etc.

Figure 6:
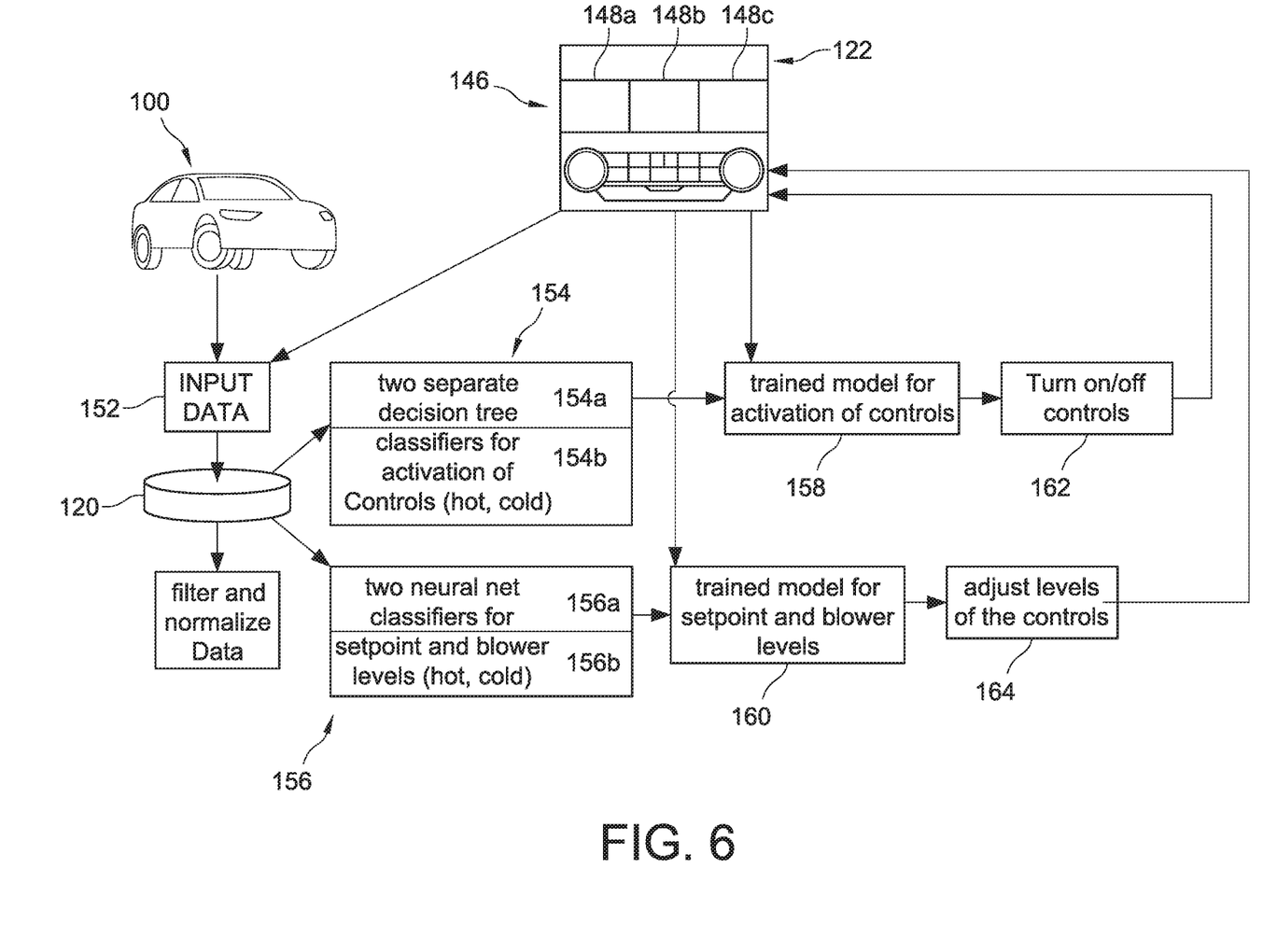
FIG. 6 further graphically illustrates the learning mode for an automatic climate control system of FIG. 3.

In more detail and with reference to FIG. 6, as described above the CCM 118/controller 120, on identifying a particular user, utilizes climate control system 116 operating patterns stored from a database 152 to determine one or more automatic climate control system 116 actuation actions and one or more automatic climate control system 116 operating patterns associated with the identified user according to various vehicle inputs 150. The CCM 118/controller 120 applies multiple predictive models to the inputs 150 and database 152 of climate control system 116 operating patterns to determine the desired one or more automatic climate control system 116 actuation actions and one or more automatic climate control system 116 operating patterns.

In one possible embodiment, the CCM 118/controller 120 applies at least one predictive model 154 to the vehicle inputs 150 and database 152 of climate control system 116 operating patterns to determine the desired one or more automatic climate control system 116 actuation actions. The CCM 118/controller 120 applies at least one different predictive model 156 to the inputs 150 and database 152 of climate control system 116 operating patterns to determine the desired one or more automatic climate control system 116 operating patterns. By this expedient, control of the automatic climate control system 116 actuation actions (on/off) and automatic climate control system 116 operating patterns (temperature setpoint and blower 108 speed) is provided a finer degree of control.

In yet another possible embodiment as shown in FIG. 6, the CCM 118/controller 120 is configured to apply two predictive models 154a and 154b, with predictive model 154a determining an automatic climate control system 116 actuation action 158 (on/off) for the climate control system 116 heating mode, and another predictive model 154b determining an automatic climate control system 116 actuation action 158 (on/off) for the climate control system 116 air-conditioning mode. Likewise, the CCM 118/controller 120 is configured to apply two different predictive models 156a and 156b, with predictive model 156a determining an automatic climate control system 116 operating pattern 160 (temperature setpoint and blower 108 speed) for the climate control system 116 heating mode, and another predictive model 156b determining an automatic climate control system 116 operating pattern 160 (temperature setpoint and blower 108 speed) for the climate control system 116 air-conditioning mode.

In an embodiment, the at least one predictive model 154a/154b comprises a Classification and Regression Trees (CART) algorithm which utilizes the vehicle inputs 150 to determine the particular automatic climate control system 116 actuation action 158 for a user, i.e. according to the vehicle inputs 150 to turn the climate control system 116 heating mode on or off, air-conditioning mode on or off, and recirculation mode on or off. The at least one different predictive model 156 is a multilayer perceptron classifier considers only climate control system 116 operating patterns discerned when the climate control features are engaged and operating. The at least one different predictive model 156a/156b utilizes the vehicle inputs 150 to determine, i.e. predict, the particular automatic climate control system 116 operating pattern 160 for the user, i.e. setting a temperature setpoint and/or a blower 108 speed according to the vehicle inputs 150 and user identity.

The CCM 118/controller 120 is further configured to consider user override actions 162, 164 and to update the at least one predictive model 154a/154b and at least one different predictive model 156a/156b accordingly. By this feature, the described automatic climate control system 116 is constantly in a "learning mode" for each identified user. A user may at step 162 elect to override actuation of a particular climate control system 116 actuation action as temperature changes, for example by disengaging the air-conditioning mode and engaging a ventilation mode to bring fresh air into the passenger cabin 102. A user may at step 164 elect to override a climate control 116 operating pattern, for example by raising or lowering a temperature setpoint or blower 108 speed. The CCM 118/controller 120 is configured to receive inputs from sensors associated with the various controls in control panel 122 used to implement the override actions, to associate them with vehicle inputs 150 recorded at the time of the override actions, and to update the at least one predictive model 154 and at least one different predictive model 156 accordingly. Thus, by the described methods the at least one predictive model 154a/154b and at least one different predictive model 156a/156b are "trained" by user actions taken during automatic operation of the climate control system 116.

Figure 7:
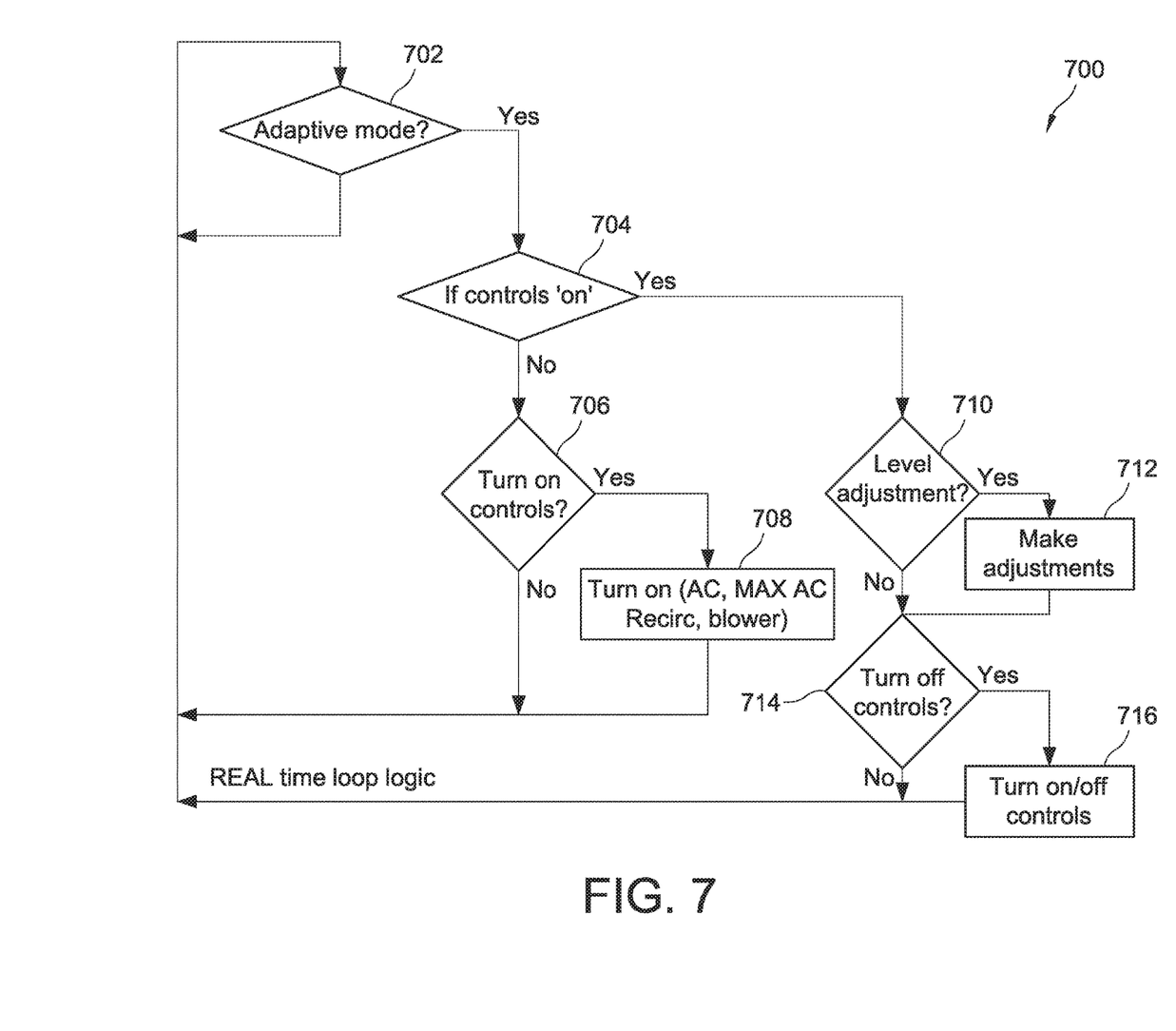
FIG. 7 illustrates in flow chart form a logic flow for an automatic climate control system according to the present disclosure.

The logic implemented by the described method is further illustrated in FIG. 7, showing a method 700 for automatically training an automatic climate control system 116. The CCM 118/controller 120 is configured to query (step 702) for activation of an adaptive mode of the climate control system 116. If the adaptive mode is activated, at step 704 the CCM 118/controller 120 queries the database 152 to determine whether the desired climate control system 116 controls are on according to the vehicle inputs 150 and user identity. For example, the database 152 may reflect that at a particular ambient temperature 150a or ambient temperature:passenger cabin temperature differential 150g in accordance with a particular user identity the climate control system 116 heating mode should be on.

If query returns that the desired climate control system 116 controls are not on (step 706), at step 708 the CCM 118/controller 120 activates the desired climate control system 116 function or mode, i.e. heating mode, air-conditioning mode, recirculation mode, and or blower 108. At step 710, the CCM 118/controller 120 queries the database 152 to determine whether the climate control system 116 operating pattern is implemented according to the vehicle inputs 150 and user identity, i.e. whether the climate control system 116 temperature setpoint and blower 108 speed is correct. If not, at step 712 the CCM 118/controller 120 makes necessary adjustments to the temperature setpoint and blower 108 speed.

At step 714, the CCM 118/controller 120 queries the database 152 to determine whether environmental conditions determine that one or more of the climate control system 116 controls should be turned off. If not, operation of the climate control system 116 continues as before. If so, at step 716 the CCM 118/controller 120 turns off the needed control according to the current vehicle inputs 150. For example, after implementing automatic operation of the climate control system 116, the CCM 118/controller 120 may receive a vehicle input 150 indicating that ambient temperature 150a (or any other environmental factor) may have changed sufficiently that the data recorded in database 152 indicate that a particular user would turn off the climate control system 116 air conditioning mode and place the system in fresh air mode. This process continues in a loop as shown in FIG. 7, whereby as new vehicle inputs 150 are received by the CCM 118/controller 120 the climate control system 116 controls are automatically turned on or off and temperature setpoints/blower speeds are adjusted as necessary according to the vehicle inputs 150 and the user identity. The CCM 118/controller 120 is further configured to refine the database 152 according to actual user actions, i.e. one or more override actions countering or altering the climate control system 116 operating pattern established as described above.

A variety of variables or parameters are contemplated for inclusion and analysis by the CCM 118/controller 120 by way of the predictive models 154a/154b and 156a/156b. These may include parameters that are pushed to or retrieved by the CCM 118/controller 120, or that are calculated by the CCM 118/controller 120. A non-exhaustive list of such parameters is presented in Table 1 below. They include parameters indicative of climate control system settings, time of day, season of year, driver aggressivity metrics, calculated parameters relating to trip statistics, and others.

TABLE 1

Parameters.

Detailed parameter list:

Rear_Defrost_Soft_Bttn_Stt (rear defrost for touch screen status)
Front_Defrost_Soft_Btn_Stt (front defrost for touch screen status)
Default_Defrost_State (status of defrost controls)
RrDefrost (request of rear defrost)
HtdMirrorReq (request of heated mirror)
RrDefrost (status of rear defrost)
HtdMirrState (status of heated mirror state)
Mirror_Manual_Override (manual override for the rear side mirror)
RCCM_DF_Cond_Seat_Req (heated seat request/driver front)
RCCM_DF_Cond_Seat_Lvl (heated seat request/level)
RCCM_PF_Cond_Seat_Req (heated seat passenger front request)
RCCM_PF_Cond_Seat_Lvl (heated seat passenger front/level)
Front_Rt_Temp_Setpt (right side climate temperature control)
Front_Left_Temp_Setpt (left side climate temperature control)
AC_Request (AC button on climate controls area)
Overriding_ModeReq (climate button, max_defrost, max AC, Auto)
Front_Rear_Blower_Req (fan level)
AirAmb_Te_Actl (ambient air/outside)
AirAmb_Te_Act1Filt (corrected ambient air/outside)
InCarTemp (in car temperature)
Veh_V_ActlEng (vehicle speed)
EngAout_N_Actl (engine speed)
CC_HtdStrWhl_Req (heated steering wheel)
Recirc_Request (recirulation request)
Pass_Rr_Cond_Seat_Req (passenger)
Smart_Wiper_Motor_Stat (smart wiper status)
Time:

Hour
Minute
Second
Day
Day of week (m, t, w, th, f, sat, sun)
Calculated parameters:

Average_trip_length
Std_dev_of_trip_length
Average_number_of_trips
Number_of_short_trips (under 2 mi)
Highway_miles
City_miles
Ratio_highway_to_city
Aggressivity metrics:

Torque
Load
Speed
Rpm
Fuel economy
Driver coasting (vehicle moving/not pressing accelerator - braking)
Driver coasting (vehicle moving/not pressing accelerator - no braking)
Seasonality:

Month
Quarter (season)

Returning to the predictive models 156a/156b, in the embodiment utilizing a multilayer perceptron classifier at a high level the process encompasses an initialization process and an activation process. At the initialization process, initial weights $w_1, w_2, \ldots w_n$ are set for each variable considered. A threshold range $\theta$ is applied to random numbers in the range [−0.05 . . . to . . . 0.5]. The perceptron is then activated by applying weights $x_1(p), x_2(p), \ldots x_n(p)$ and desired output $y_d(p)$ and calculating the actual output at iteration p−1. In an embodiment, the number of perceptron inputs where step is a step activation function according to the equation $Y(p)=\text{step}(\Sigma_{i=1}^{n} x_i(p)w_i(p)-\text{theta})$.

Figure 8:
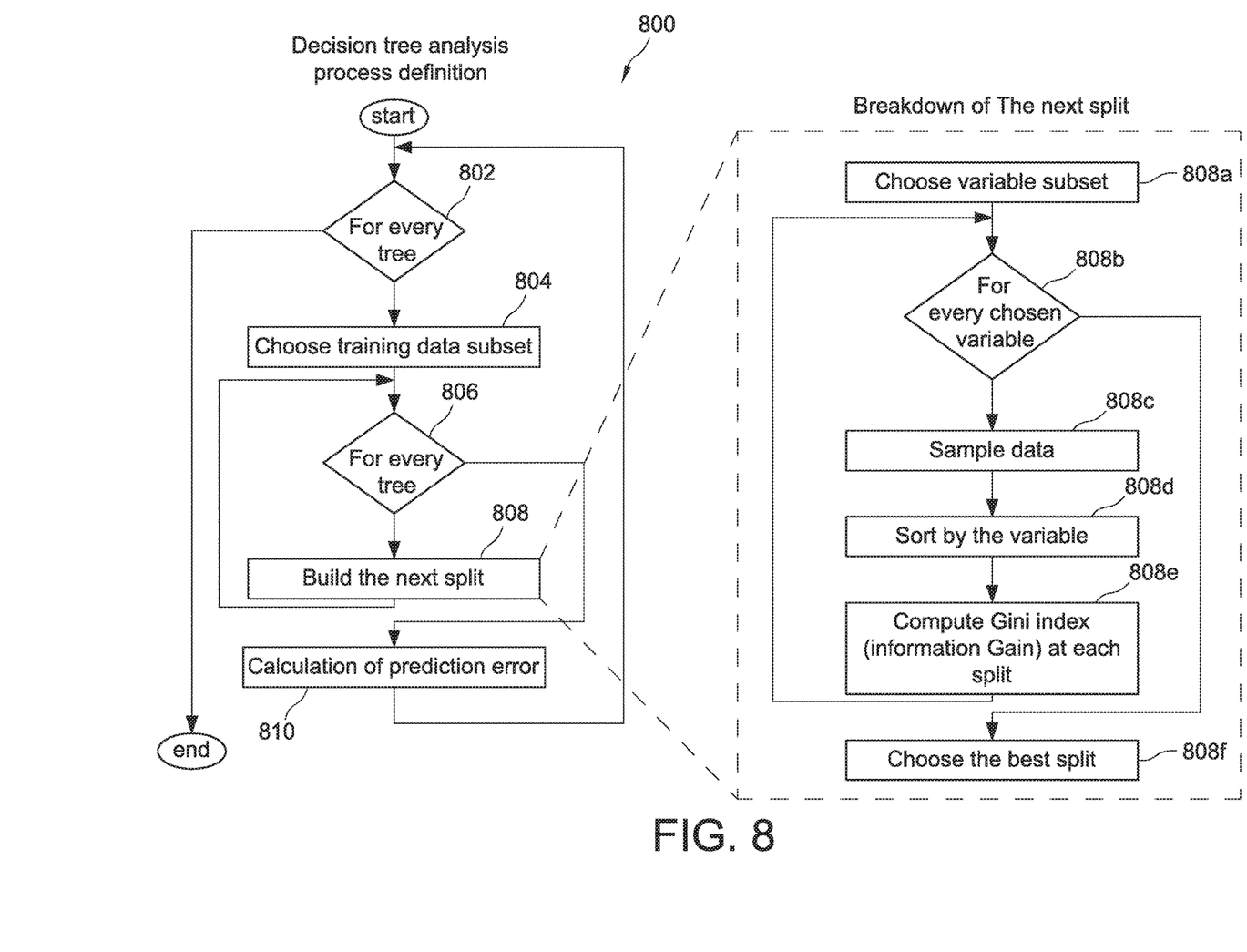
FIG. 8 illustrates a generalized decision tree process followed for an automatic climate control system according to the present disclosure.

The analysis of actions to be taken, i.e. whereby CCM 118/controller 120 implement changes to the climate control system, proceeds along decision trees. As shown at a high level in FIG. 8, a method 800 for selecting climate control system settings proceeds by, at step 802, selecting a decision tree. At step 804, a training data subset is selected. At step 806, for each tree a next split is built at step 808. Also, at step 810, for each decision tree a prediction error is calculated. As shown in the inset of FIG. 8, for step 808 of building a next split, a specific variable subset is chosen, such as from Table 1 above, at step 808a. For each chosen variable (step 808b), actual climate control system data are sampled at step 808c and sorted according to the chosen variable (step 808d). At step 808e, an information gain is calculated for each split. From this information, the best (i.e. least likely to be incorrect) split is chosen at step 808f and the climate control system is actuated accordingly.

Figure 9:
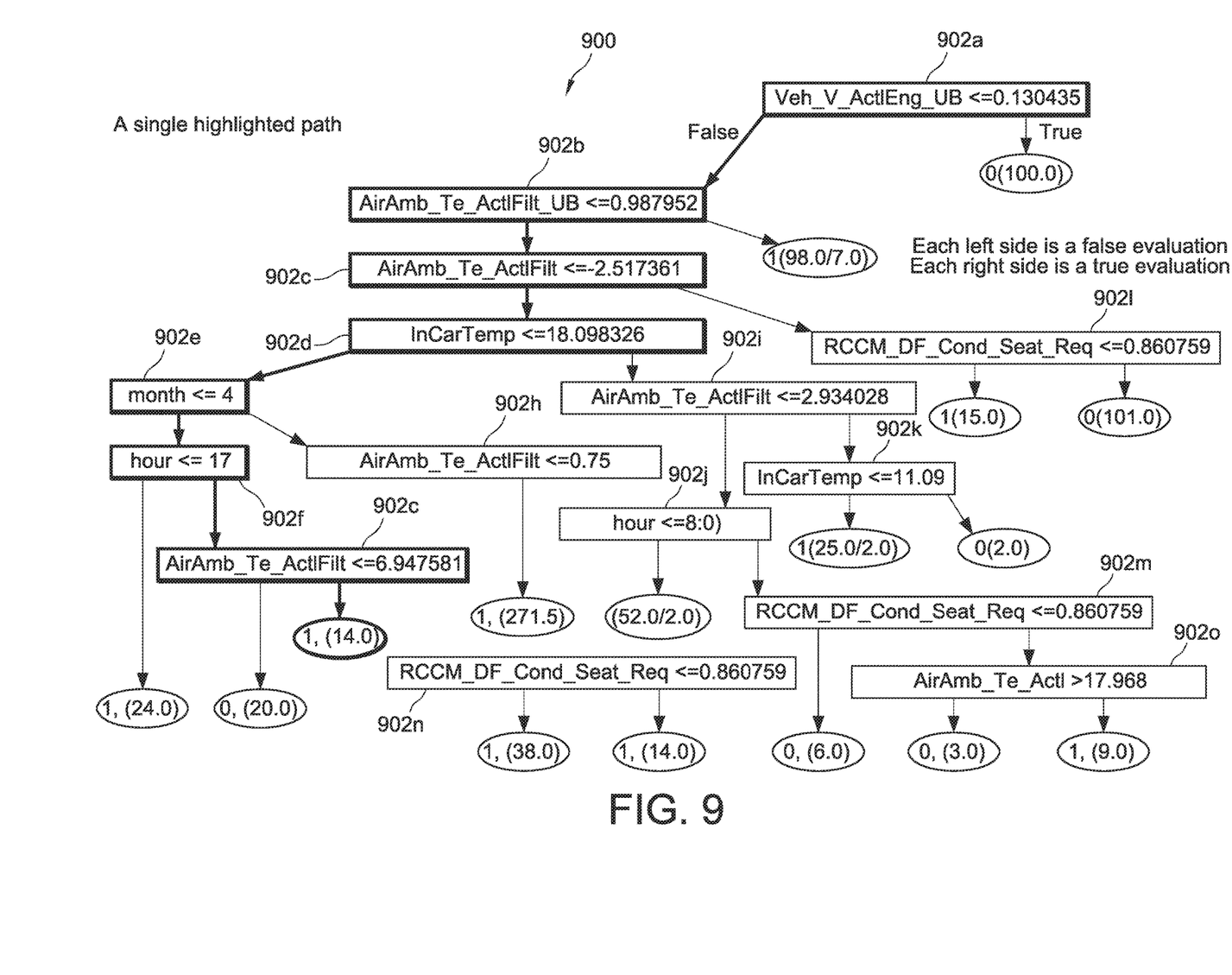
FIG. 9 illustrates a specific pruned decision tree representative of a single decision tree model generated for a single vehicle.

As a further example, a pruned decision tree 900 representative of a single decision tree model generated for a single vehicle is presented in FIG. 9. This represents the logic/decision tree process followed by the CCM 118/controller 120 and predictive models as summarized above. The model provides the decision process followed according to the predictive models 154a/154b in turning a heat function of the climate control system on/off, and further assumes an ambient temperature of >70° C. and a blower 108 level setting of 1. For each listed variable (i.e. node) analyzed, the left branch represents a false evaluation and the right branch represents a true evaluation.

A single decision tree path taken by the CCM 118/controller 120 is highlighted for purposes of example. The highlighted path represents application of the predictive models 154a/154b by the CCM 118/controller 120 using nodes 902a . . . o representing measured, determined, and calculated parameters as set forth representatively in Table 1 in making a decision as to whether to turn on the climate control system heat function. If the CCM 118/controller 120 determines that a particular node represents a true statement according to determined or calculated parameters as described above, the heat is turned on. If the CCM 118/controller 120 determines that a particular node represents a false statement according to determined or calculated parameters as described above, the analysis proceeds to the next node.

Following the highlighted path taken by the CCM 118/controller 120 in applying predictive models 154a/154b, the decision tree considers the following nodes: 902a: vehicle speed; 902b: ambient air temperature/outside; 902c: corrected ambient air temperature/outside; 902d: in-car temperature; 902e: month of year; 902f: hour of day. The conditions for the highlighted path can therefore be represented as follows:
if Veh_V_Acl1Eng_UB≤0.130435 and if AirAmb_Te_Act1Filt≤0.987952 and if InCarTemp≤18.098326 and if month≤4 and if hour≤17 and if AirAmb_Te_Act1Filt≤6.947581, then turn on the heat.

Of course, the decision tree 900 may include more or fewer variables selected from Table 1 and elsewhere. Further, the decision tree path is revisited by the CCM 118/controller 120 at intervals, as particular variables change over time and with vehicle use.

Figure 10:
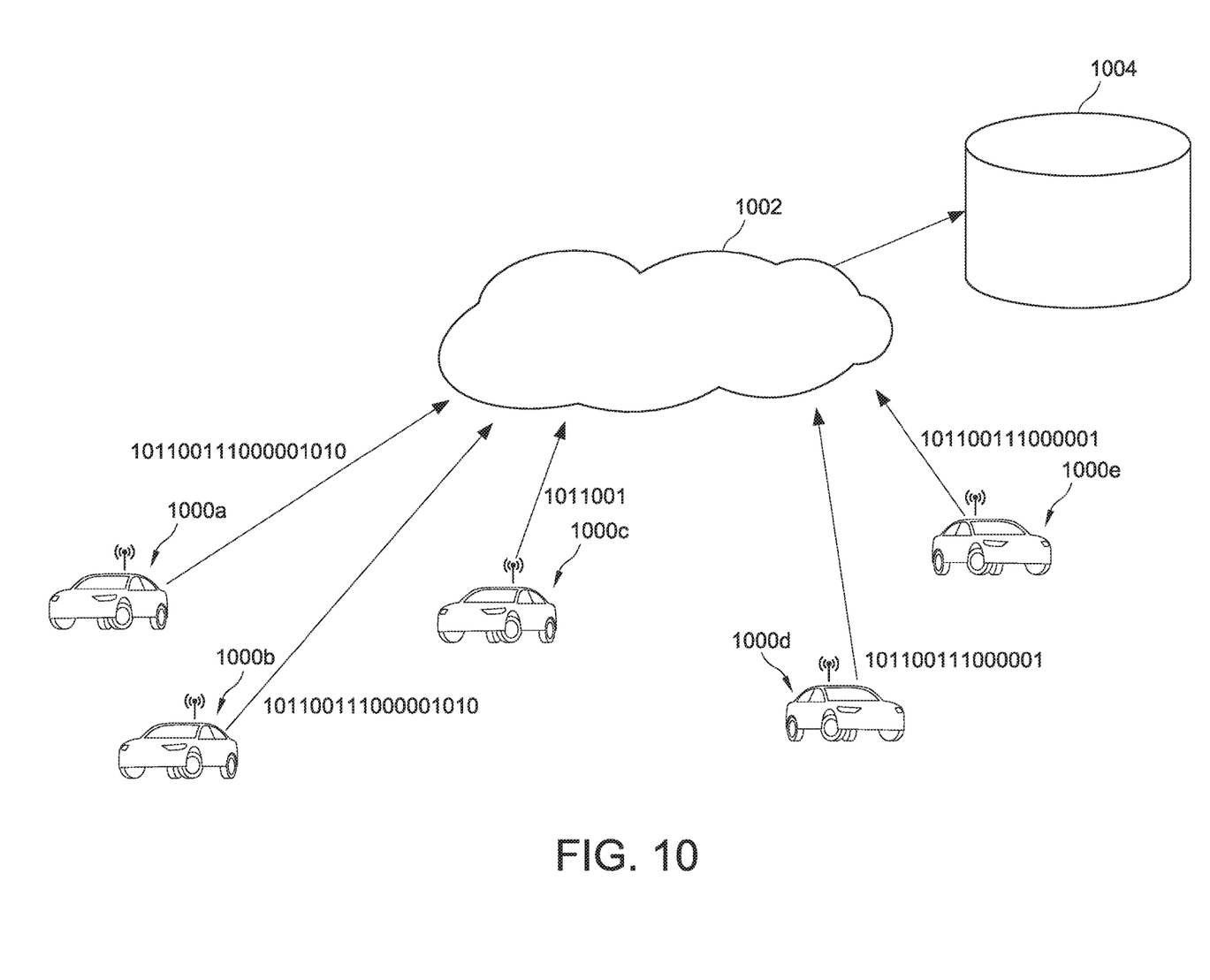
FIG. 10 illustrates consolidation of climate control system actuation patterns, driver behavior patterns, and other variables into a default database.

In a further aspect of the present disclosure, it is contemplated to consolidate patterns of driver behavior, climate control system 116 settings, and other metrics as set forth in Table 1 into a default database. With reference to FIG. 10, a group of drivers 1000a, 1000b, 1000c, 1000d, 1000e are selected and transmit one or all of the metrics listed in Table 1, such as by wireless means, to a centralized locale. This may be a "cloud" system 1002 such as is known in the art, a centralized server (not shown), or any other suitable centralized data repository. This information is consolidated and stored in a database 1004. It will be appreciated that the number of drivers 1000a . . . 1000x may be very large, and so the information in the database 1004 will be highly representative of a wide variety of driver vehicle operation patterns, climate control system 116 operation patterns, etc. The information in database 1004 may also include additional information such as vehicle model, model year, option packages, and geographic location.

Figure 11:
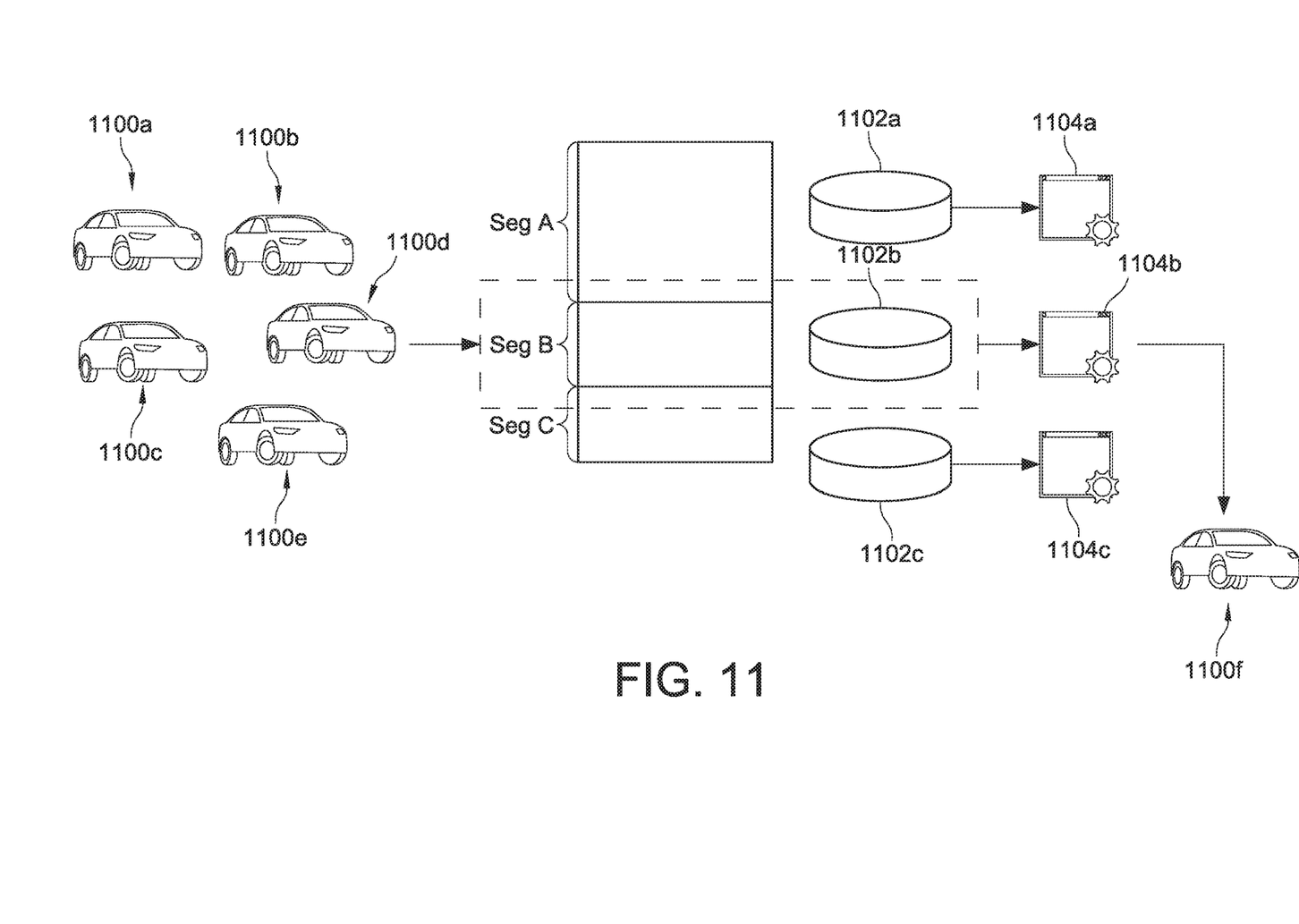
FIG. 11 illustrates organization of the default database of FIG. 10 into driver peer groups.

With reference to FIG. 11, data from database 1004 relating to a group of vehicles 1100 having a same or similar make, model, and model year are analyzed by driver metrics (see Table 1) and grouped to provide driver "peer groups" 1102a, 1102b, 1102c, that is groups of drivers of similar vehicles who operate the vehicle according to similar metrics of driver aggressivity, climate control system 116 operation patterns, etc. Machine learning models 1104a, 1104b, 1104c (i.e., the predictive models 154, 156 described above) are established for each driver peer group as described above. Then, when a driver acquires a vehicle 1100f having a like make, model, model year, etc. as, for example, peer group 1102b, that vehicle 1100f is initialized with the machine learning models 1104b as a default. Then, as the driver operates vehicle 1100f including occasionally overriding particular automatic climate control system 116 commands as described above, the machine learning models 1104b are updated according to those override commands, and the machine learning models 1104b then provide automatic climate control system 116 operation more closely approximating a specific user's desires and preferences rather than only according to the default database 1004 and predictive models 1104a,b,c established according to driver peer groups 1102a,b,c.

Obvious modifications and variations are possible in light of the above teachings. All such modifications and variations are within the scope of the appended claims when interpreted in accordance with the breadth to which they are fairly, legally and equitably entitled.

What is claimed:

1. A method for controlling an automatic climate control system of a vehicle, comprising:
by one or more onboard processors in operative communication with one or more sensors:
initiating the automatic climate control system;
receiving from the one or more sensors at least a vehicle input and a user identifier input;
implementing a unique user climate control system actuation action according to the received vehicle input and user identifier input provided by applying at least one predictive model to a stored set of climate control system operating parameters; and
implementing a unique user climate control system operating pattern according to the received vehicle input and user identifier input provided by applying at least one different predictive model to the stored set of climate control system operating parameters.

2. The method of claim 1 including receiving, by the one or more onboard processors, a sensor input indicative of a manual initiation of the automatic climate control system.

3. The method of claim 1 including, by the one or more onboard processors, storing the unique user climate control system actuation action and the unique climate control system operating pattern for each of one or more users.

4. The method of claim 1 including, by the one or more onboard processors:
receiving from a sensor a user manual climate control system override action input;
updating one or both of the at least one predictive model and the at least one different predictive model according to the user manual climate control system override action input to provide one or both of an updated unique user climate control system actuation action and an updated unique user climate control system operating pattern; and
storing one or both of the updated unique user climate control system actuation action and the updated unique user climate control system operating pattern.

5. The method of claim 1 wherein the vehicle input received from the one or more sensors is one or more of: an ambient temperature input, a passenger cabin temperature input, a clock input, a calendar input, a trip statistic, a driver aggressivity of vehicle operation metric, a determination of a climate control system operative status, and a determination of a vehicle engine operative status.

6. The method of claim 1, including, by the one or more onboard processors, selecting the unique user climate control system actuation action from one or both of:
powering on one or more of a climate control system heating mode, a climate control system air-conditioning mode, and a climate control system recirculation mode; and
powering off one or more of the climate control system heating mode, the climate control system air-conditioning mode, and the climate control system recirculation mode.

7. The method of claim 6, wherein the at least one predictive model is a Classification and Regression Tree (CART) model.

8. The method of claim 7 including, by the one or more onboard processors, selecting a first CART model for the steps of powering on and selecting a second CART model for the steps of powering off.

9. The method of claim 1 including, by the one or more onboard processors, selecting the unique user climate control system operating pattern from one or both of setting a climate control system temperature setpoint value and setting a climate control system blower speed value.

10. The method of claim 9, wherein the at least one different predictive model is a multilayer perceptron behavior classifier model.

11. The method of claim 10 including, by the one or more onboard processors, selecting a first multilayer perceptron behavior classifier model for the step of setting the climate control system temperature setpoint value and selecting a second multilayer perceptron behavior classifier model for the step of setting the climate control system blower speed value.

12. The method of claim 4, wherein the user manual climate control system override action input includes one or more of: manually powering on or off a climate control system heating mode, manually powering on or off a climate control system air-conditioning mode, manually powering on or off a climate control system recirculation mode, manually adjusting a climate control system temperature setpoint value, and manually adjusting a climate control system blower speed value.

13. A system for controlling an automatic climate control system of a vehicle, comprising:
a controller in operative communication with one or more sensors, the controller comprising one or more onboard processors, memory, and storage and being configured at least to:
initiate the automatic climate control system;

receive from the one or more sensors at least a vehicle input and a user identifier input;

implement a unique user climate control system actuation action according to the received vehicle input and user identifier input provided by applying at least one predictive model to a stored set of climate control system operating parameters; and implement a unique user climate control system operating pattern according to the received vehicle input and user identifier input provided by applying at least one different predictive model to the stored set of climate control system operating parameters.

14. The system of claim 13, wherein the controller is further configured to receive from the one or more sensors an input indicative of a manual initiation of the automatic climate control system.

15. The system of claim 13, wherein the controller is further configured to:

receive from the one or more sensors a user manual climate control system override action input;

update one or both of the at least one predictive model and the at least one different predictive model according to the user manual climate control system override action input to provide one or both of an updated unique user climate control system actuation action and an updated unique user climate control system operating pattern; and store one or both of the updated unique user climate control system actuation action and the updated unique user climate control system operating pattern.

16. The system of claim 13, wherein the one or more sensors are selected from the group consisting of: an ambient temperature sensor, a passenger cabin temperature sensor, a clock or timer, a calendar application, a sensor adapted to provide inputs relative to a trip statistic, an engine speed sensor, and an engine starter sensor.

17. The system of claim 13, wherein the controller is further configured to select the unique user climate control system actuation action from one or both of:

powering on one or more of a climate control system heating mode, a climate control system air-conditioning mode, and a climate control system recirculation mode; and powering off one or more of the climate control system heating mode, the climate control system air-conditioning mode, and the climate control system recirculation mode.

18. The system of claim 17, wherein the controller is further configured to select the unique user climate control system operating pattern from one or both of setting a particular climate control system temperature setpoint value and setting a particular climate control system blower speed value.

19. The system of claim 15, wherein the controller is configured to determine the user manual climate control system override action input according to inputs received from one or more sensors indicative of one or more of: manually powering on or off a climate control system heating mode, manually powering on or off a climate control system air-conditioning mode, manually powering on or off a climate control system recirculation mode, manually adjusting a climate control system temperature setpoint value, and manually adjusting a climate control system blower speed value.

* * * * *